US011226881B2

United States Patent
Sun et al.

(10) Patent No.: US 11,226,881 B2
(45) Date of Patent: Jan. 18, 2022

(54) RESPONDING TO A FAULT OF A DISK WHICH STORES METADATA AND USER DATA IN DIFFERENT DISK SLICES

(71) Applicant: EMC IP Holding Company LLC, Hopkinton, MA (US)

(72) Inventors: Lei Sun, Beijing (CN); Jianbin Kang, Beijing (CN); Geng Han, Beijing (CN); Xinlei Xu, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/994,918

(22) Filed: Aug. 17, 2020

(65) Prior Publication Data
US 2021/0342235 A1    Nov. 4, 2021

(30) Foreign Application Priority Data
Apr. 30, 2020   (CN) .......................... 202010360999.6

(51) Int. Cl.
*G06F 11/00* (2006.01)
*G06F 11/20* (2006.01)
*G06F 11/34* (2006.01)
*G06F 11/30* (2006.01)

(52) U.S. Cl.
CPC ...... *G06F 11/2094* (2013.01); *G06F 11/3034* (2013.01); *G06F 11/3495* (2013.01); *G06F 2201/88* (2013.01)

(58) Field of Classification Search
CPC ............. G06F 11/0757; G06F 11/1088; G06F 11/1092; G06F 11/3094; G06F 11/3034; G06F 11/3495
See application file for complete search history.

(56) References Cited

U.S. PATENT DOCUMENTS

| | | | |
|---|---|---|---|
| 7,363,420 B2 * | 4/2008 | Lin ....................... | G06F 3/0614 711/103 |
| 8,429,455 B2 * | 4/2013 | Nagai ................. | G06F 11/3034 714/26 |
| 9,152,353 B1 * | 10/2015 | Wang .................... | G06F 3/0665 |
| 9,804,939 B1 * | 10/2017 | Bono .................. | G06F 11/1088 |
| 9,984,090 B1 | 5/2018 | Shang et al. | |
| 10,101,945 B1 * | 10/2018 | Panidis ................ | G06F 3/0673 |
| 10,346,220 B2 | 7/2019 | Liu et al. | |

(Continued)

*Primary Examiner* — Elmira Mehrmanesh
(74) *Attorney, Agent, or Firm* — BainwoodHuang

(57) ABSTRACT

Techniques for managing a storage disk involve monitoring a duration of a fault of a faulted storage disk, wherein the faulted storage disk includes a first disk slice configured to store metadata and a second disk slice configured to store user data. The techniques further involve, in response to the duration reaching a first threshold value, replacing the first disk slice with a first available disk slice in a first non-faulted storage disk. The techniques further involve, in response to the duration reaching a second threshold value greater than the first threshold value, replacing the second disk slice with a second available disk slice in a second non-faulted storage disk. Accordingly, fault monitoring windows with different lengths are applied to disk slices for different logical tiers in the faulted storage disk. In this way, the reliability of data of a metadata tier can be effectively improved.

20 Claims, 4 Drawing Sheets

(56) References Cited

U.S. PATENT DOCUMENTS

| | | | |
|---|---|---|---|
| 10,372,384 B2 | 8/2019 | Liu et al. | |
| 10,496,483 B2 | 12/2019 | Xiao et al. | |
| 10,747,460 B2 | 8/2020 | Sun et al. | |
| 10,824,361 B2 | 11/2020 | Sun et al. | |
| 10,860,483 B2 | 12/2020 | Fliess et al. | |
| 10,922,277 B1 | 2/2021 | De Souter et al. | |
| 11,003,536 B2 | 5/2021 | Han et al. | |
| 11,093,317 B1 | 8/2021 | Vankamamidi et al. | |
| 2007/0273709 A1* | 11/2007 | Kimura | H04N 19/89 345/619 |
| 2009/0172248 A1* | 7/2009 | You | G06F 12/0246 711/103 |
| 2010/0106907 A1* | 4/2010 | Noguchi | G06F 11/2069 711/114 |
| 2010/0138687 A1* | 6/2010 | Noguchi | G06F 11/2069 714/47.1 |
| 2010/0251012 A1* | 9/2010 | Zwisler | G06F 11/1092 714/6.32 |
| 2011/0197091 A1* | 8/2011 | Kurasawa | G06F 11/0727 714/2 |
| 2014/0103955 A1* | 4/2014 | Avritch | G01R 31/64 324/764.01 |
| 2019/0220372 A1* | 7/2019 | Kang | G06F 12/0246 |
| 2019/0332476 A1* | 10/2019 | Zhuo | G06F 11/3485 |
| 2020/0004620 A1* | 1/2020 | Suenaga | G06F 11/0772 |

\* cited by examiner

RESPONDING TO A FAULT OF A DISK WHICH STORES METADATA AND USER DATA IN DIFFERENT DISK SLICES

CROSS-REFERENCE TO RELATED APPLICATION

This application claims priority to Chinese Patent Application No. CN202010360999.6, on file at the China National Intellectual Property Administration (CNIPA), having a filing date of Apr. 30, 2020, and having "METHOD, ELECTRONIC DEVICE AND COMPUTER PROGRAM PRODUCT FOR MANAGING STORAGE DISK" as a title, the contents and teachings of which are herein incorporated by reference in their entirety.

TECHNICAL FIELD

Embodiments of the present disclosure relate to the field of data storage, and more particularly, to a method, an electronic device, and a computer program product for managing a storage disk.

BACKGROUND

With the development of data storage technologies, various data storage devices can already provide users with higher and higher data storage capacities. When data storage capacities are improved, users also have put forward higher and higher demands for the data reliability. At present, various data storage systems based on Redundant Array of Independent Disks (RAIDs) have been developed to improve the data reliability. When one or more physical disks in the storage system are faulted, data in a faulted physical disk can be restored from data on other normally operating physical disks.

SUMMARY OF THE INVENTION

Embodiments of the present disclosure provide a method, an electronic device, and a computer program product for managing a storage disk.

In a first aspect of the present disclosure, a method for managing a storage disk is provided. The method includes monitoring a duration of a fault of a faulted storage disk, wherein the faulted storage disk includes a first disk slice configured to store metadata and a second disk slice configured to store user data. The method further includes, in response to the duration reaching a first threshold value, replacing the first disk slice with a first available disk slice in a first non-faulted storage disk. The method further includes, in response to the duration reaching a second threshold value greater than the first threshold value, replacing the second disk slice with a second available disk slice in a second non-faulted storage disk.

In a second aspect of the present disclosure, an electronic device is provided. The electronic device includes a processor and a memory coupled to the processor. The memory has an instruction stored therein. The instruction, when executed by the processor, causes the device to execute actions. The actions include monitoring a duration of a fault of a faulted storage disk, wherein the faulted storage disk includes a first disk slice configured to store metadata and a second disk slice configured to store user data. The actions further include, in response to the duration reaching a first threshold value, replacing the first disk slice with a first available disk slice in a first non-faulted storage disk. The actions further include, in response to the duration reaching a second threshold value greater than the first threshold value, replacing the second disk slice with a second available disk slice in a second non-faulted storage disk.

In a third aspect of the present disclosure, a computer program product is provided. The computer program product is tangibly stored on a computer readable medium and includes a machine-executable instruction; and the machine-executable instruction, when executed, causes a machine to execute the method according to the first aspect.

The Summary section is provided to introduce the selection of concepts in a simplified form, which will be further described in the Detailed Description below. The Summary section is not intended to identify key features or main features of the present disclosure, nor is it intended to limit the scope of the present disclosure.

BRIEF DESCRIPTION OF THE DRAWINGS

The above and other objectives, features, and advantages of the present disclosure will become more apparent by describing example embodiments of the present disclosure in detail with reference to the accompanying drawings, and in the example embodiments of the present disclosure, the same reference numerals generally represent the same components. In the drawings.

DETAILED DESCRIPTION

Figure 1:
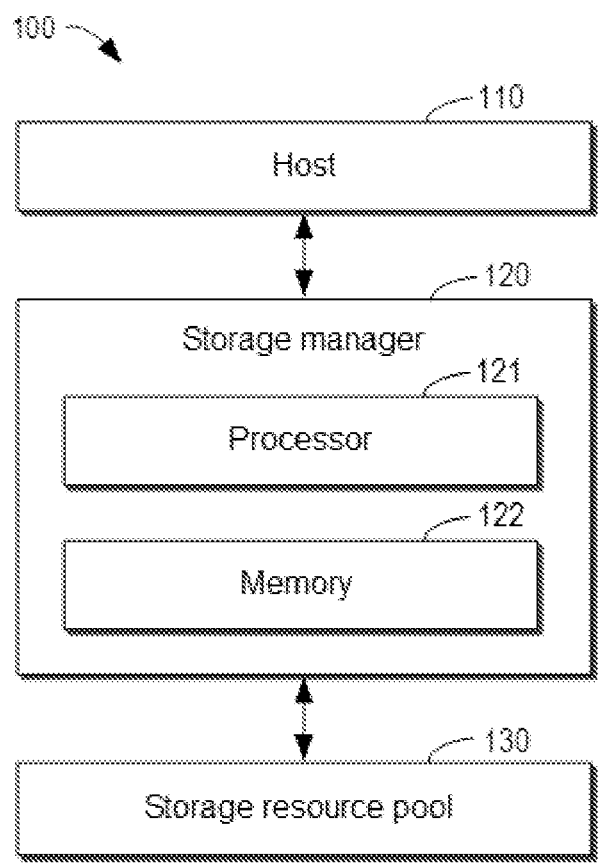
FIG. 1 illustrates a schematic diagram of an example environment where the embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to several example embodiments shown in the accompanying drawings. Although preferred embodiments of the present disclosure are illustrated in the accompanying drawings, it should be understood that these embodiments are described only to enable those skilled in the art to better understand and implement the present disclosure, and do not limit the scope of the present disclosure in any way.

The term "include" and its variants as used herein mean open-ended inclusion, i.e., "including but not limited to." Unless specifically stated, the term "or" means "and/or." The term "based on" means "based at least in part on." The terms "one example embodiment" and "one embodiment" mean "at least one example embodiment." The term "another embodiment" means "at least one additional embodiment." The terms "first," "second," etc. may refer to different or identical objects. Other explicit and implicit definitions may also be included below.

As mentioned above, in a storage system, various logical tiers (also referred to as tiers for short) that are created on a back-end physical disk can be managed. Such a logical tier may include a user data tier for user data and a metadata tier for metadata. In some storage systems, the metadata tier may be further divided, for example, into a mapper boot tier, a metadata storage tier, and a virtual large block (VLB) tier. In general, data in the metadata tier is more critical than data in the user data tier.

At the back end, a physical disk in the storage system is generally divided into a plurality of disk slices. A plurality of disk slices allocated on one or more physical disks can be organized into storage units to store data. The storage units may further be divided into different types of storage units according to the divided logical tiers, for example, a metadata storage unit and a user data storage unit. The metadata storage unit that logically belongs to the metadata tier can be configured to store mapping information, index information, status information, etc. related to the storage system, for example, mapping information from the storage unit to the physical disk and the status of the storage unit (such as a normal status or a faulted status). The user data storage unit that logically belongs to the user data tier can be configured to store user data.

Therefore, in such a storage system, the storage unit is composed of a plurality of disk slices, and the logical tier is composed of at least one storage unit belonging to this tier. Each disk slice in a physical disk may be allocated to different types of storage units, which in turn may be used for different logical tiers. That is, a single physical disk may include disk slices for the metadata tier and disk slices for the user data tier.

The fault of the physical disk may sometimes have a short-term failure condition, that is, the faulted physical disk may not be permanently faulted. After a short period of time, the originally faulted physical disk may be restored from the fault. In order to cope with such a short-term fault, after the physical disk is faulted, the data of the physical disk is not immediately rebuilt or the fault is not immediately transferred.

In a current storage system solution, in order to cope with the short-term failure condition of the physical disk, a timer is usually maintained as a fault monitoring window for the faulted physical disk, and the timer may sometimes be referred to as a spare timer. The timer has, for example, a period of validity of 5 minutes. Once a certain physical disk is faulted, the timer for the faulted physical disk will be initiated, and the storage unit affected by the faulted physical disk (for example, the disk slice thereof included in the faulted physical disk) will be marked as "degraded."

If the faulted physical disk is restored from the fault before the timer expires, incremental rebuilding will be performed for those storage units marked as "degraded." This means that only the data updated during the fault of the physical disk needs to be restored. Unchanged data does not need to be restored because the version of the data in the physical disk that was once faulted is correct.

If the faulted physical disk is not restored from the fault before the timer expires, damaged disk slices in each degraded storage unit will be replaced with a new disk slice from a non-faulted physical disk. In addition, normal rebuilding will be performed, which means that all the data will be restored for the new disk slice.

It can be seen that in the current storage system solution, no matter which logical tier the affected storage unit or disk slice belongs to, all the affected storage units or disk slices will be treated indiscriminately.

If a physical disk is faulted permanently, all the affected storage units may only be restored after the timer expires. If, within the monitoring window that waits for the timer to expire, another disk slice included in the affected metadata storage unit is faulted (for example, the physical disk on which the affected metadata storage unit is located is also faulted), the metadata in the metadata storage unit may not be restored. Correspondingly, the associated user data may not be read or processed, either.

In view of the importance of the metadata tier, the inventor of the present application realizes that the data of the metadata tier should be restored as early as possible. However, if the period of validity of the above timer is simply shortened, it is not beneficial to the performance of the storage system. This simple solution will cause unnecessary and even frequent disk slice (for example, disk slices for user data tiers) replacement, thus increasing background operations.

In view of the above circumstances, the inventor of the present application realizes that when a physical disk is faulted, it is advantageous to perform different processing for different logical tiers. Even if both the metadata tier (such as 1+1 mirroring) and the user data tier (such as 4+1 RAID 5 or 8+1 RAID 5) have only one magnetic disk fault redundancy, after the fault occurs, it is still expected that the metadata tier may be particularly treated.

Embodiments of the present disclosure provide a solution for managing a storage disk to solve one or more of the above problems and other potential problems. In this solution, when a fault occurs, fault monitoring windows with different lengths are applied to disk slices for different logical tiers in a faulted storage disk. For example, a duration of the fault starts to be monitored in response to the occurrence of the fault. The faulted storage disk includes a metadata disk slice configured to store metadata and a user data disk slice configured to store user data. If the duration reaches a first threshold value, the metadata disk slice may be replaced with a first available disk slice in a first non-faulted storage disk. The duration of the fault is continued to be monitored, and if the duration reaches a second threshold value greater than the first threshold value, the user data disk slice may be replaced with a second available disk slice in a second non-faulted storage disk.

In the solution provided, the fault monitoring windows with different lengths are applied for different logical tiers, so as to perform differentiated processing on the disk slices for different logical tiers when the fault occurs. In this way, the degradation time of a metadata tier can be effectively reduced. Therefore, the solution can effectively improve the reliability of data of the metadata tier. In addition, compared with simple reduction of the fault monitoring window, this solution may not add replacement of inessential disk slices.

FIG. 1 illustrates a schematic diagram of example environment 100 where the embodiments of the present disclosure can be implemented. As shown in FIG. 1, environment 100 includes host 110, storage manager 120, and storage resource pool 130. It should be understood that the structure and function of environment 100 are described for example purposes only, and do not imply any limitation to the scope of the present disclosure. For example, the embodiments of the present disclosure can also be applied to an environment different from environment 100.

Storage resource pool 130 may include one or more storage disks, such as a magnetic disk, an optical disk, or a solid state disk (SSD). Each storage disk may be divided into a plurality of disk slices. For example, each disk slice may have the same size. A plurality of disk slices allocated on a plurality of physical disks may be organized into storage units to store data. Storage resource pool 130 may include various types of storage units according to different types of stored data or according to divided logical tiers, for example, a storage unit (also referred to as "user data storage unit") configured to store user data, a storage unit (also referred to as "metadata storage unit") configured to store metadata related to storage systems, etc. The metadata storage unit may store mapping information, index information, status information, etc. related to the storage system, for example, mapping information from the storage unit to a physical disk and the status of the storage unit (such as a normal status or a faulted status). The data stored in the plurality of disk slices in the storage unit may be related to each other. For example, the plurality of disk slices in the storage unit may be mirrored disk slices. The plurality of disk slices in the storage unit may also be organized in a RAID manner.

In storage resource pool 130, the storage unit (including the user data storage unit and the metadata storage unit) is composed of a plurality of disk slices, and the logical tier is composed of at least one storage unit belonging to this tier. Each disk slice in the storage disk may be allocated to different types of storage units, which in turn may be used for different logical tiers. That is, a single storage disk in storage resource pool 130 may include disk slices for a metadata tier and disk slices for a user data tier.

Storage manager 120 may include processor 121 and memory 122. Memory 122 may be any volatile storage medium, non-volatile storage medium, or a combination thereof, which are currently known or to be developed in the future. Storage manager 120 may be configured to manage storage resource pool 130 and process input/output (I/O) requests from host 110. Host 110 may be any physical computer, virtual machine, server, etc. that runs user applications.

Host 110 may send an I/O request to storage manager 120, and the I/O request is, for example, used to read data from and/or write data to a target storage unit in storage resource pool 130. The metadata of the target storage unit may be stored in the metadata storage unit. In response to receiving the I/O request from host 110, storage manager 120 may firstly acquire the metadata of the target storage unit from the metadata storage unit, and the metadata may indicate the mapping information from the target storage unit to the physical disk, the status of the target storage unit, etc. If the target storage unit is in a normal status, in response to the I/O request being a read request, storage manager 120 may forward the I/O request to the target storage unit based on the acquired metadata, so as to read data from the target storage unit, and return the read data to host 110. In response to the I/O request being a write request, storage manager 120 may forward the I/O request to the target storage unit based on the acquired metadata, so as to write the data to the target storage unit.

Figure 2:
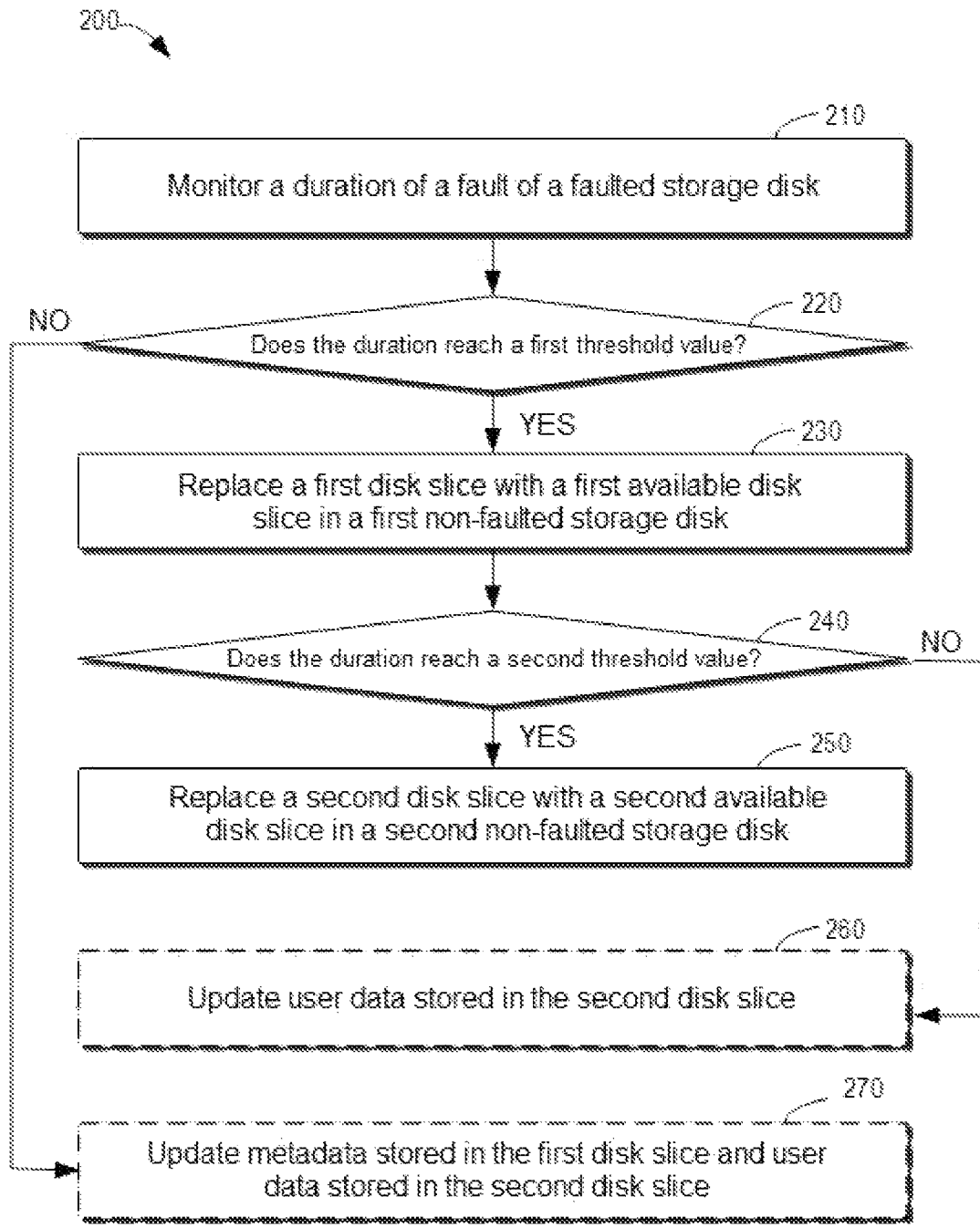
FIG. 2 illustrates a flow chart of a method for managing a storage disk according to an embodiment of the present disclosure.

Therefore, if the corresponding metadata storage unit is faulted, the user data may not be written or read. Due to the importance of the metadata tier, it is expected that the disk slice for the metadata tier and the disk slice for the user data tier will be subjected to differentiated processing when the storage disk is faulted. FIG. 2 illustrates a flow chart of example method 200 for managing a storage disk according to an embodiment of the present disclosure. Method 200 may be, for example, executed by storage manager 120 (e.g., processor 121) as shown in FIG. 1. It should be understood that method 200 may also include additional actions not shown and/or omit actions shown, and the scope of the present disclosure is not limited in this regard. Method 200 is described in detail below with reference to FIG. 1.

As shown in FIG. 2, at block 210, storage manager 120 monitors a duration of a fault of a faulted storage disk. The faulted storage disk may include a disk slice configured to store metadata (which is also referred to herein as a first disk slice or a metadata disk slice) and a disk slice configured to store user data (which is also referred to herein as a second disk slice or a user data disk slice). It should be understood that the faulted storage disk may include more than one metadata disk slice and more than one user data disk slice.

Figure 3:
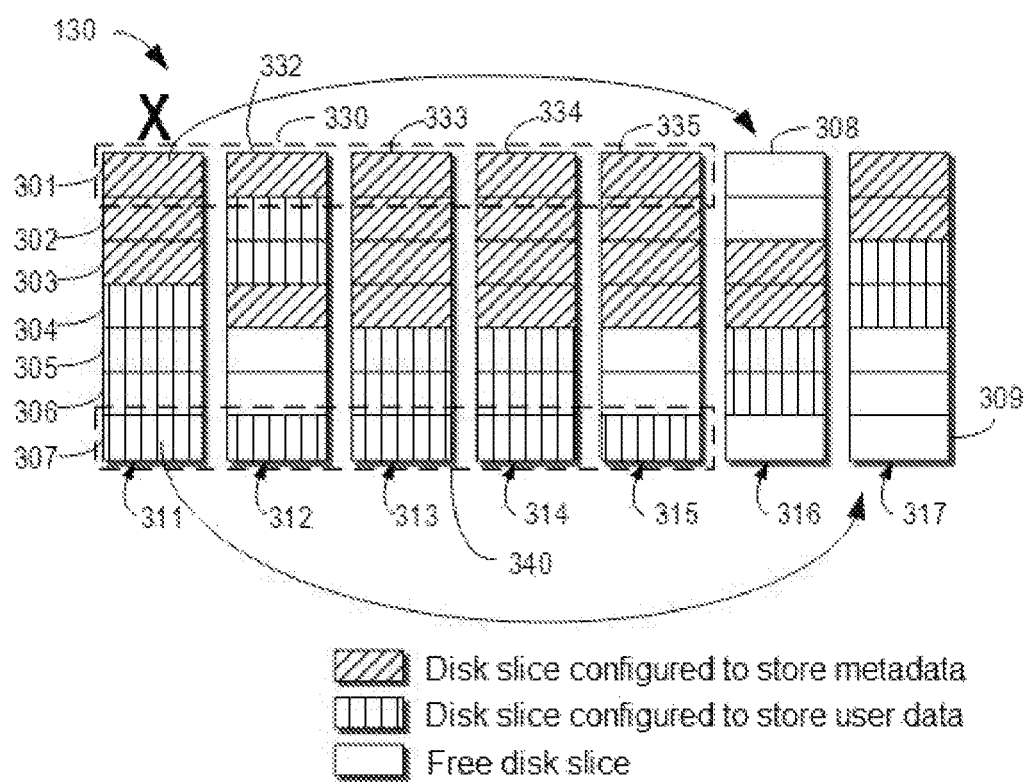
FIG. 3 illustrates a schematic diagram of allocating disk slices according to an embodiment of the present disclosure.

FIG. 3 illustrates a schematic diagram of allocating disk slices according to an embodiment of the present disclosure. As shown in FIG. 3, storage resource pool 130 may include, for example, storage disks 311-317. Each disk may be divided into a plurality of disk slices, some of which have been allocated, while others are free. In this example, storage disk 311 may be divided into a plurality of disk slices 301-307. Disk slices 301-303 may be allocated to store metadata. Therefore, disk slices 301-303 may be disk slices for a metadata tier. Each of disk slices 301-303 may further logically belong to different metadata storage units. For example, metadata storage unit 330 may include disk slice 301.

Disk slices 304-307 may be allocated to store user data. Therefore, disk slices 304-307 may be disk slices for a user data tier. Each of disk slices 304-307 may further logically belong to different user data storage units. For example, user data storage unit 340 may include disk slice 307.

The following will describe storage disk 311 being temporarily unavailable or permanently unavailable because of a fault. In addition, disk slice 301 serving as an example of a first disk slice and disk slice 307 serving as an example of a second disk slice will be described.

A duration of a fault of faulted storage disk 311 may be monitored in various ways. In some embodiments, storage manager 120 may monitor the duration of the fault by recording time elapsed since the fault occurred.

In some embodiments, in response to the occurrence of the fault, storage manager 120 may monitor the duration by initiating a timer. For example, a first timer with a period of validity of a first threshold value and a second timer with a period of validity of a second threshold value may be initiated to monitor the duration. The first threshold value may be less than the second threshold value. The first timer with the shorter period of validity may be used for the metadata tier, and the second timer with the longer period of validity may be used for the user data tier. Without limitation and as an example only, the first timer may have a period of validity of 1 minute or about 1 minute, and the second timer may have a period of validity of 5 minutes or about 5 minutes.

During the monitoring, if it is determined that faulted storage disk 311 is restored from the fault, the monitoring of the duration is stopped. For example, the first timer and the second timer will be reset. Referring back to FIG. 2, at block 220, storage manager 120 determines whether the duration reaches the first threshold value. If it is determined at block 220 that the duration has reached the first threshold value, then method 200 proceeds to block 230. For example, if the first timer expires and faulted storage disk 311 is not restored from the fault, method 200 may proceed to block 230.

At block 230, storage manager 120 replaces first disk slice 301 with a first available disk slice in a first non-faulted storage disk. For example, if the first timer expires and faulted storage disk 311 is not restored from the fault, all disk slices for the metadata tier in faulted storage disk 311 may be replaced with available disk slices. Data stored in first disk slice 301 may be written to free disk slices of a non-faulted storage disk. At the same time, storage manager 120 will not process disk slices 304-307 configured to store the user data in faulted storage disk 311.

In some embodiments, as shown in FIG. 3, storage manager 120 may determine non-faulted storage disk 316 (which may also be referred to as first non-faulted storage disk 316) from storage resource pool 130 including a plurality of disks. Each disk of the plurality of disks in storage resource pool 130 may be divided into a plurality of disk slices. Thus, storage manager 120 may allocate a free disk slice as the first available disk slice from first non-faulted storage disk 316. For example, disk slice 308 may be allocated as the first available disk slice. Storage manager 120 may determine the metadata stored in the first disk slice, and may write the determined metadata into first available disk slice 308. The data in first disk slice 301 may not be directly read due to the fault of faulted storage disk 311. Based on the architectures of different storage systems, the data stored in first disk slice 301 may be determined or restored in different ways.

In some embodiments, if the storage system includes the storage unit described above, metadata storage unit 330 including first disk slice 301 may be used to determine the data stored in first disk slice 301. In the example of FIG. 3, storage manager 120 may determine metadata storage unit 330 including first disk slice 301. As an example, when storage disk 311 is faulted, all storage units with disk slices located in faulted storage disk 311 may be marked as "degraded." Storage manager 120 may determine metadata storage unit 330 based on the "degraded" mark. In addition to first disk slice 301, metadata storage unit 330 may further include at least one disk slice in a storage disk different from faulted storage disk 311. Storage manager 120 may determine the metadata stored in first disk slice 301 based on the data stored in the at least one disk slice.

In the example of FIG. 3, in addition to first disk slice 301, metadata storage unit 330 may further include disk slices 332-335. The disk slices in metadata storage unit 330 may be organized, for example, in the form of 4+1 RAID 5. For example, four disk slices in first disk slice 301 and disk slices 332-335 may be used to store data, and the other disk slice may be used to store parity data. Therefore, the data stored in first disk slice 301 may be restored based on the data in disk slices 332-335.

In some embodiments, the disk slices in metadata storage unit 330 may be mirrored to each other, for example, 1+1 mirrored. In this case, the data stored in the mirrored disk slices may be directly read. After first disk slice 301 is replaced with disk slice 308, first disk slice 301 may be removed from metadata storage unit 330, and disk slice 308 may be added to metadata storage unit 330. It should be understood that the above operation regarding replacing first disk slice 301 may be applied to other disk slices used to store the metadata in faulted storage disk 311, such as disk slices 302 and 303. Referring back to FIG. 2, storage manager 120 may continue to monitor the duration of the fault while replacing first disk slice 301 (optionally, and disk slices 302 and 303). For example, the second timer will continue to run. At block 240, storage manager 120 determines whether the duration reaches the second threshold value greater than the first threshold value. If it is determined at block 240 that the duration has reached the second threshold value, then method 200 proceeds to block 250. For example, if the second timer expires and faulted storage disk 311 is not restored from the fault, method 200 may proceed to block 250.

At block 250, storage manager 120 replaces second disk slice 307 with a second available disk slice in a second non-faulted storage disk. For example, if the second timer expires and faulted storage disk 311 is not restored from the fault, all disk slices for the user data tier in faulted storage disk 311, such as disk slices 304-307, may be replaced with a plurality of available disk slices. Data stored in data slices 304-307 may be written into free disk slices of a non-faulted storage disk.

In some embodiments, as shown in FIG. 3, storage manager 120 may determine non-faulted storage disk 317 (which may also be referred to as second non-faulted storage disk 317) from storage resource pool 130 including a plurality of disks). Thus, storage manager 120 may allocate a free disk slice as the second available disk slice from second non-faulted storage disk 317. For example, disk slice 309 may be allocated as the second available disk slice. Storage manager 120 may determine the user data stored in the second disk slice, and may write the determined user data into second available disk slice 309.

The data in second disk slice 307 may not be directly read due to the fault of faulted storage disk 311. Based on the architectures of different storage systems, the data stored in second disk slice 307 may be determined or restored in different ways.

In some embodiments, if the storage system includes the storage unit described above, user data storage unit 340 including second disk slice 307 may be used to determine the data stored in second disk slice 307. In the example of FIG. 3, storage manager 120 may determine user data storage unit 340 including second disk slice 307. In addition to second disk slice 307, user data storage unit 340 may further include at least one disk slice in a storage disk different from faulted storage disk 311. Storage manager 120 may determine the user data stored in second disk slice 307 based on the data stored in the at least one disk slice.

In the example of FIG. 3, in addition to second disk slice 307, user data storage unit 340 may further include disk slices in storage disks 312-315. The disk slices in user data storage unit 340 may be organized in the form of 4+1 RAID 5. For example, four disk slices in user data storage unit 340 may be used to store data, and the other disk slice may be used to store parity data. Therefore, the data stored in second disk slice 307 may be restored based on the data in the disk slices in storage disks 312-315.

In some embodiments, the disk slices in user data storage unit 340 may be mirrored to each other, for example, 1+1 mirrored. In this case, the data stored in the mirrored disk slices may be directly read. After second disk slice 307 is replaced with disk slice 309, second disk slice 307 may be removed from user data storage unit 340, and disk slice 309 may be added to user data storage unit 340. It should be understood that the above operation regarding replacing second disk slice 307 may be applied to other disk slices used to store the user data in faulted storage disk 311, such as disk slices 304-306.

Referring back to FIG. 2, if storage manager 120 determines at block 240 that the duration does not reach a value greater than the second threshold value, then method 200 may proceed to block 260 in some embodiments. For example, if faulted storage disk 311 is restored from the fault before the second timer expires, method 200 may proceed to block 260. If the replacement of first disk slice 301 or the replacement of other metadata disk slices in faulted storage disk 311 executed at block 250 has not been completed when the faulted storage disk 311 is restored from the fault, the replacement of first disk slice 301 or the replacement of other metadata disk slice may be continued.

In some embodiments, if there is an update related to second disk slice 307 during the fault, at block 260, storage manager 120 may update the user data stored in second disk slice 307. For example, if there is an I/O request (such as a write request) for the user data stored in second disk slice 307 from an upper tier during the fault, the user data stored in second disk slice 307 may need to be updated. For example, storage manager 120 may determine user data storage unit 340 including second disk slice 307. Then, the user data stored in second disk slice 307 may be updated based on the update of other disk slices included in user data storage unit 340 during the fault. In other words, at block 260, rebuilding of user data storage unit 340 is performed.

Referring back to FIG. 2, if storage manager 120 determines at block 220 that the duration does not reach the first threshold value, then method 200 may proceed to block 270 in some embodiments. For example, if faulted storage disk 311 is restored from the fault before the first timer expires, method 200 may proceed to block 270.

In some embodiments, if there is an update related to first disk slice 301 and/or second disk slice 307 during the fault, at block 260, storage manager 120 may update the metadata stored in first disk slice 301 and/or the user data stored in second disc slice 307. For example, if the I/O request from the upper tier during the fault causes information indicated by the metadata in first disk slice 301 to change, the metadata stored in first disk slice 301 may need to be updated. For example, storage manager 120 may determine metadata storage unit 330 including first disk slice 301. Then, the metadata stored in first disk slice 301 may be updated based on the updates of other disk slices 332-335 included in metadata storage unit 330 during the fault. The update of second disk slice 307 is the same as the above description with reference to block 260. Therefore, at block 270, rebuilding of metadata storage unit 330 and user data storage unit 340 is performed. Storage units that have not been changed during the fault may not be rebuilt.

The operation described above for first disk slice 301 may be applied to any disk slice configured to store the metadata in faulted storage disk 311, and the operation described for second disk slice 307 may be applied to any disk slice configured to store the user data in faulted storage disk 311.

It can be seen from the above description that the embodiments of the present disclosure provide a solution for managing a storage disk. In the solution provided, fault monitoring windows with different lengths are applied for different logical tiers, so as to perform differentiated processing on the disk slices for different logical tiers when the fault occurs. In this way, the degradation time of a metadata tier can be effectively reduced. Therefore, the solution can effectively improve the reliability of data of the metadata tier. In addition, compared with simple reduction of the fault monitoring window, this solution may not add replacement of inessential disk slices.

Figure 4:
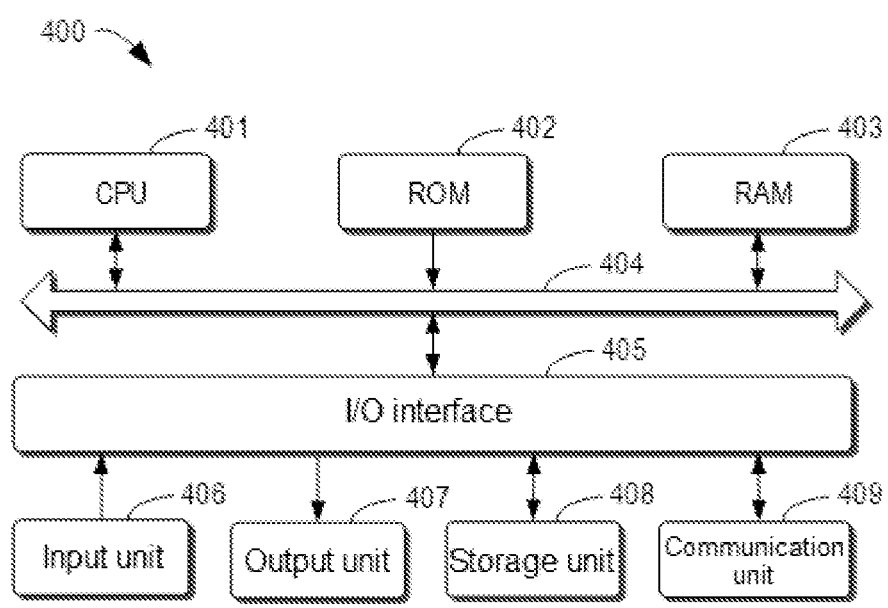
FIG. 4 illustrates a block diagram of an example device configured to implement the embodiments of the present disclosure.

FIG. 4 illustrates a schematic block diagram of example device 400 that may be used to implement embodiments of the present disclosure. As shown in the figure, device 400 includes central processing unit (CPU) 401 that may perform various appropriate actions and processes according to computer program instructions stored in read-only memory (ROM) 402 or computer program instructions loaded from storage unit 408 to random access memory (RAM) 403. In RAM 403, various programs and data required for the operation of device 400 may also be stored. CPU 401, ROM 402, and RAM 403 are connected to each other through bus 404. Input/output (I/O) interface 405 is also connected to bus 404. Multiple components in device 400 are connected to I/O interface 405, including: input unit 406, such as a keyboard or a mouse; output unit 407, such as various types of displays or speakers; storage unit 408, such as a magnetic disk or an optical disk; and communication unit 409, such as a network card, a modem, or a wireless communication transceiver. Communication unit 409 allows device 400 to exchange information/data with other devices over a computer network such as the Internet and/or various telecommunication networks.

Processing unit 401 performs various methods and processes described above, such as method 200. For example, in some embodiments, method 200 may be implemented as a computer software program or computer program product, which is tangibly included in a machine-readable medium, such as storage unit 408. In some embodiments, some or all of the computer programs may be loaded and/or installed onto device 400 via ROM 402 and/or communication unit 409. One or more steps of method 200 described above may be performed when the computer program is loaded into RAM 403 and executed by CPU 401. Alternatively, in other embodiments, CPU 401 may be configured to perform method 200 by any other suitable manners (e.g., by means of firmware).

According to some embodiments of the present disclosure, a computer-readable medium on which a computer program is stored is provided. The program, when executed by the processor, implements the method according to the present disclosure.

Those skilled in the art should understand that the steps of the method of the present disclosure described above can be implemented by a general-purpose computing apparatus, and they can be concentrated on a single computing apparatus or distributed on a network composed of multiple computing apparatuses. Optionally, they can be implemented with program code executable by the computing apparatus, so that they can be stored in the storage device to be executed by the computing apparatus, or they can be separately made into individual integrated circuit modules, or multiple modules or steps thereof are implemented as a single integrated circuit module. In this way, the present disclosure is not limited to any particular hardware and software combination.

It should be understood that although several apparatuses or sub-apparatuses of the device are mentioned in the above detailed description, this division is merely by way of example and not mandatory. In fact, according to the embodiments of the present disclosure, the features and functions of the two or more apparatuses described above may be embodied in one apparatus. Conversely, the features and functions of one apparatus described above can be further divided and embodied by multiple apparatuses.

The above description is only optional embodiments of the present disclosure, and is not intended to limit the present disclosure. For those skilled in the art, the present disclosure can have various modifications and changes. Any modification, equivalent replacement, improvement, etc. that is made within the spirit and principle of the present disclosure shall fall within the protection scope of the present disclosure.

The invention claimed is:

1. A method for managing a storage disk, comprising:
monitoring a duration of a fault of a faulted storage disk, wherein the faulted storage disk comprises a first disk slice configured to store metadata and a second disk slice configured to store user data;
in response to the duration reaching a first threshold value, replacing the first disk slice with a first available disk slice in a first non-faulted storage disk; and
in response to the duration reaching a second threshold value greater than the first threshold value, replacing the second disk slice with a second available disk slice in a second non-faulted storage disk;
wherein replacing the first disk slice with the first available disk slice comprises:
determining the first non-faulted storage disk from a storage resource pool comprising a plurality of storage disks, wherein each storage disk in the plurality of storage disks is divided into a plurality of disk slices;
allocating a free disk slice as the first available disk slice from the first non-faulted storage disk;
determining metadata stored in the first disk slice; and
writing the determined metadata into the first available disk slice.

2. The method according to claim 1, wherein determining metadata stored in the first disk slice comprises:
determining a metadata storage unit comprising the first disk slice, wherein the metadata storage unit further comprises at least one disk slice in a storage disk different from the faulted storage disk; and
determining the metadata stored in the first disk slice based on data stored in the at least one disk slice.

3. The method according to claim 1, wherein monitoring the duration comprises:
in response to the occurrence of the fault, initiating a first timer with a period of validity of the first threshold value and a second timer with a period of validity of the second threshold value to monitor the duration.

4. The method according to claim 1, further comprising:
determining a user data storage unit comprising the second disk slice, wherein the user data storage unit further comprises at least one disk slice in a storage disk different from the faulted storage disk; and
updating the user data stored in the second disk slice based on the update of the at least disk slice during the fault.

5. The method according to claim 1, wherein replacing the second disk slice with the second available disk slice comprises:
determining the second non-faulted storage disk from a storage resource pool comprising a plurality of storage disks, wherein each storage disk in the plurality of storage disks is divided into a plurality of disk slices;
allocating a free disk slice as the second available disk slice from the second non-faulted storage disk;
determining user data stored in the second disk slice; and
writing the determined user data into the second available disk slice.

6. The method according to claim 1, further comprising:
storing user data in another disk slice in the first non-faulted storage disk that is different from the first available disk slice.

7. The method according to claim 1, further comprising:
after monitoring the duration has been initiated and prior to the duration reaching the first threshold value, receiving a metadata update corresponding to information in the first disk slice.

8. The method according to claim 7, wherein writing the determined metadata into the first available disk slice includes:
storing, as the determined metadata, updated metadata which is based on the metadata update.

9. An electronic device, comprising:
a processor; and
a memory coupled to the processor, wherein the memory has an instruction stored therein, the instruction, when executed by the processor, causes the device to execute actions, and the actions comprise:
monitoring a duration of a fault of a faulted storage disk, wherein the faulted storage disk comprises a first disk slice configured to store metadata and a second disk slice configured to store user data;
in response to the duration reaching a first threshold value, replacing the first disk slice with a first available disk slice in a first non-faulted storage disk; and
in response to the duration reaching a second threshold value greater than the first threshold value, replacing the second disk slice with a second available disk slice in a second non-faulted storage disk;
wherein replacing the first disk slice with the first available disk slice comprises:
determining the first non-faulted storage disk from a storage resource pool comprising a plurality of storage disks, wherein each storage disk in the plurality of storage disks is divided into a plurality of disk slices;
allocating a free disk slice as the first available disk slice from the first non-faulted storage disk;
determining metadata stored in the first disk slice; and
writing the determined metadata into the first available disk slice.

10. The device according to claim 9, wherein determining metadata stored in the first disk slice comprises:
determining a metadata storage unit comprising the first disk slice, wherein the metadata storage unit further comprises at least one disk slice in a storage disk different from the faulted storage disk; and
determining the metadata stored in the first disk slice based on data stored in the at least one disk slice.

11. The device according to claim 9, wherein monitoring the duration comprises:
in response to the occurrence of the fault, initiating a first timer with a period of validity of the first threshold value and a second timer with a period of validity of the second threshold value to monitor the duration.

12. The device according to claim 9, further comprising:
determining a user data storage unit comprising the second disk slice, wherein the user data storage unit further comprises at least one disk slice in a storage disk different from the faulted storage disk; and
updating the user data stored in the second disk slice based on the update of the at least disk slice during the fault.

13. The device according to claim 9, wherein replacing the second disk slice with the second available disk slice comprises:

determining the second non-faulted storage disk from a storage resource pool comprising a plurality of storage disks, wherein each storage disk in the plurality of storage disks is divided into a plurality of disk slices;

allocating a free disk slice as the second available disk slice from the second non-faulted storage disk;

determining user data stored in the second disk slice; and writing the determined user data into the second available disk slice.

14. The device according to claim 9, wherein the actions further comprise:

storing user data in another disk slice in the first non-faulted storage disk that is different from the first available disk slice.

15. A computer program product having a non-transitory computer readable medium which stores a set of instructions to manage a storage disk; the set of instructions, when carried out by computerized circuitry, causing the computerized circuitry to perform a method of:

monitoring a duration of a fault of a faulted storage disk, wherein the faulted storage disk comprises a first disk slice configured to store metadata and a second disk slice configured to store user data;

in response to the duration reaching a first threshold value, replacing the first disk slice with a first available disk slice in a first non-faulted storage disk; and in response to the duration reaching a second threshold value greater than the first threshold value, replacing the second disk slice with a second available disk slice in a second non-faulted storage disk;

wherein replacing the first disk slice with the first available disk slice comprises:

determining the first non-faulted storage disk from a storage resource pool comprising a plurality of storage disks, wherein each storage disk in the plurality of storage disks is divided into a plurality of disk slices;

allocating a free disk slice as the first available disk slice from the first non-faulted storage disk;

determining metadata stored in the first disk slice; and writing the determined metadata into the first available disk slice.

16. The computer program product according to claim 15, wherein determining metadata stored in the first disk slice comprises:

determining a metadata storage unit comprising the first disk slice, wherein the metadata storage unit further comprises at least one disk slice in a storage disk different from the faulted storage disk; and determining the metadata stored in the first disk slice based on data stored in the at least one disk slice.

17. The computer program product according to claim 15, wherein monitoring the duration comprises:

in response to the occurrence of the fault, initiating a first timer with a period of validity of the first threshold value and a second timer with a period of validity of the second threshold value to monitor the duration.

18. The computer program product according to claim 15, wherein the method further comprises:

determining a user data storage unit comprising the second disk slice, wherein the user data storage unit further comprises at least one disk slice in a storage disk different from the faulted storage disk; and updating the user data stored in the second disk slice based on the update of the at least disk slice during the fault.

19. The computer program product according to claim 15, wherein replacing the second disk slice with the second available disk slice comprises:

determining the second non-faulted storage disk from a storage resource pool comprising a plurality of storage disks, wherein each storage disk in the plurality of storage disks is divided into a plurality of disk slices;

allocating a free disk slice as the second available disk slice from the second non-faulted storage disk;

determining user data stored in the second disk slice; and writing the determined user data into the second available disk slice.

20. The computer program product according to claim 15, wherein the method further comprises:

storing user data in another disk slice in the first non-faulted storage disk that is different from the first available disk slice.

* * * * *